United States Patent
Koos et al.

(10) Patent No.: US 6,800,960 B2
(45) Date of Patent: Oct. 5, 2004

(54) SHORT CIRCUIT PROTECTION SYSTEM FOR A STARTER CIRCUIT

(75) Inventors: Frederic B. Koos, East Liverpool, OH (US); Raymond C. Culp, Austintown, OH (US); John B Kirk, Canfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 190 days.

(21) Appl. No.: 10/139,719

(22) Filed: May 6, 2002

(65) Prior Publication Data

US 2003/0205937 A1 Nov. 6, 2003

(51) Int. Cl.⁷ .................... B60R 22/00; F02N 17/00
(52) U.S. Cl. .................... 307/10.6; 123/179.1
(58) Field of Search ................ 307/10.1, 10.3, 307/10.6, 10.7; 361/23, 30–34, 55–57; 123/179.1, 179.3, 630, 632

(56) References Cited

U.S. PATENT DOCUMENTS

| | | | |
|---|---|---|---|
| 4,345,554 A | * | 8/1982 | Hildreth et al. .......... 123/179.2 |
| 4,958,084 A | | 9/1990 | Carlo et al. |
| 5,287,831 A | * | 2/1994 | Andersen et al. ........ 123/179.3 |
| 5,965,954 A | | 10/1999 | Johnson et al. |
| 5,977,654 A | | 11/1999 | Johnson et al. |
| 6,249,106 B1 | | 6/2001 | Turner et al. |
| 6,413,119 B1 | | 7/2002 | Gabrisko, Jr. et al. |
| 6,607,251 B2 | | 8/2003 | Baumgartner et al. |

* cited by examiner

*Primary Examiner*—Matthew V. Nguyen
(74) *Attorney, Agent, or Firm*—David P. Wood

(57) ABSTRACT

A method and apparatus are provided for short circuit protection to a motor vehicle starter circuit. The invention includes providing a switching mechanism positioned intermediate to a DC power source and the starter. A controller manipulates the switching mechanism between an open position and a closed position, the closed position connecting the starter circuit to the DC power source and the open position disconnecting the starter circuit from the DC power source.

31 Claims, 2 Drawing Sheets

SHORT CIRCUIT PROTECTION SYSTEM FOR A STARTER CIRCUIT

TECHNICAL FIELD

The present invention relates to a system for providing short circuit protection to an electrical circuit that connects a device to a DC power source. In particular, the present invention is considered suitable for removing voltage from the circuit that connects a vehicle starter to a battery during the periods when current is not needed to power the starter.

BACKGROUND OF THE INVENTION

Motor vehicles, such as cars, marine vessels, trucks and the like almost universally include a battery that is used for engine ignition. The battery is electrically connected to a starter that is used to crank the ignition. Typically, the starter is actuated by a solenoid relay located adjacent the starter. As a result, the conductor that carries current from the battery to the starter solenoid contains the voltage supplied by the battery. In addition, the conductor is typically sized to carry a significant amount of current needed to drive the starter.

In a typical motor vehicle 12 volt electrical system, the current that goes through the starter circuit has an initial surge of 900 to 1500 amps and has a steady state current of 200 to 600 amps for about six seconds. Of all the electrical cables in a motor vehicle, the starter cable can provide the most energy at a short. It is impractical to protect the starter circuit with a fuse since a large fuse would be required to support the current needed to power the starter. This size fuse would provide little or no protection during the periods of time when current is not needed to operate the starter. As a result, in certain conditions, such as when the starter circuit wire insulation is cut or pierced, an unprotected starter circuit could cause electrical arcing or short circuits. This could shut down the vehicle or damage other components.

Some existing battery protection devices are capable of shutting off power to the entire electrical system under certain conditions. Such conditions include detection of a short circuit condition, battery low voltage, or activation of a theft deterrent system. Likewise, short circuit current sensors can be used in a system to shut off current after a short condition occurs. However, these devices shut off current only after the short has already occurred.

As the need for energy in motor vehicles increases with the introduction of more electrically powered components and systems, vehicle manufacturers are contemplating the introduction of higher voltage electrical architectures. Current proposals contemplate replacing 12 volt systems with a 42 volt system. The use of higher voltages increases the probability that a damaged starter cable could result in an electrical arc. The use of higher voltages also increases the amount of energy available to damage vehicle components and systems. Therefore, higher voltage vehicle electrical systems will need short circuit protection.

Thus far, the prior art does not adequately address prevention of short circuits and electrical arcing in a starter circuit.

SUMMARY OF THE INVENTION

The present invention overcomes the problems noted above and satisfies a need for a short circuit protection system for an electrical circuit that connects a battery to an unfused device. The invention overcomes the problems of the prior art by providing a system that removes voltage from the circuit that electrically connects a device to a DC power source, such as a battery, during periods when the device does not require power.

The present invention is particularly useful to protect a starter circuit from short circuits, electrical arcing, and current leakage. In contrast to battery disconnect systems known in the prior art, this invention can remove energy from a single circuit without shutting down power to the entire electrical system. The present invention can thus be incorporated with battery protection systems and anti-theft systems known in the prior art. When used as a motor vehicle starter circuit protection system, the present invention protects the circuit while the vehicle is in operation. Other vehicle battery disconnect systems disconnect power only when conditions such as low battery voltage are detected.

In accordance with the present invention, a short circuit protection system is provided to electrically protect a section of conductor that is a part of the conductive path between a DC power source, such as a battery, and a device powered by the DC power source. The system comprises two switches in the conductive path between the battery and the device. It also includes a microprocessor capable of receiving inputs indicating that the device is to be turned on and shut off and further capable of generating outputs to open and close the two switches.

In accordance with the present invention, a method is provided to remove voltage from a section of electrical conductor that is a part of the conductive path between a DC power source, such as a battery, and a device powered by the DC power source. A preferred method comprises the steps of detecting a signal indicating the device is to be shut off, opening a switch that lies in the conductive path between the device and a first end of the section of conductor to be protected, and then opening a second switch that lies in the conductive path between the battery and the other end of the section of conductor to be protected. An advantage of using this method is that the switch located between the battery and the section of conductor to be protected closes when there is no electrical load. As a result, this switch can be designed to be less rigorous than the switch located between the device and the section of conductor to be protected.

In accordance with another preferred aspect of the present invention, the method includes the steps of detecting a signal indicating the device is to be turned on, closing the switch that lies in the conductive path between the battery and a first end of the section of conductor to be protected, and then closing a second switch that lies in the conductive path between the device and the second end of the section of conductor to be protected. Once these steps are completed, power is provided to the device. The method further comprises the steps of detecting a signal indicating the device is to be shut off, opening the second switch that lies in the conductive path between the device and second end of the section of conductor to be protected, and then opening the switch that lies in the conductive path between the battery and the first end of the section of conductor to be protected. As a result, power is first removed from the device then removed from the section of conductor to be protected. An advantage of using this method is that the switch located between the battery and the first end of the section of conductor to be protected always closes and opens when there is no electrical load. As a result, this switch can be designed to be less rigorous than the switch located between the device and the section of conductor to be protected.

It is thus an object of the present invention to provide an improved system that removes voltage from a section of the circuit that electrically connects a battery to a device powered by the battery;

It is yet another object of the present invention to enable the use of a switch in the conductive path that is less rigorous than a second switch located in the conductive path.

BRIEF DESCRIPTION OF THE DRAWINGS

The invention may take physical form in certain parts and arrangement of parts, the preferred embodiment of which will be described in detail and illustrated in the accompanying drawings which form a part hereof and wherein.

DETAILED DESCRIPTION OF THE INVENTION

Figure 1:
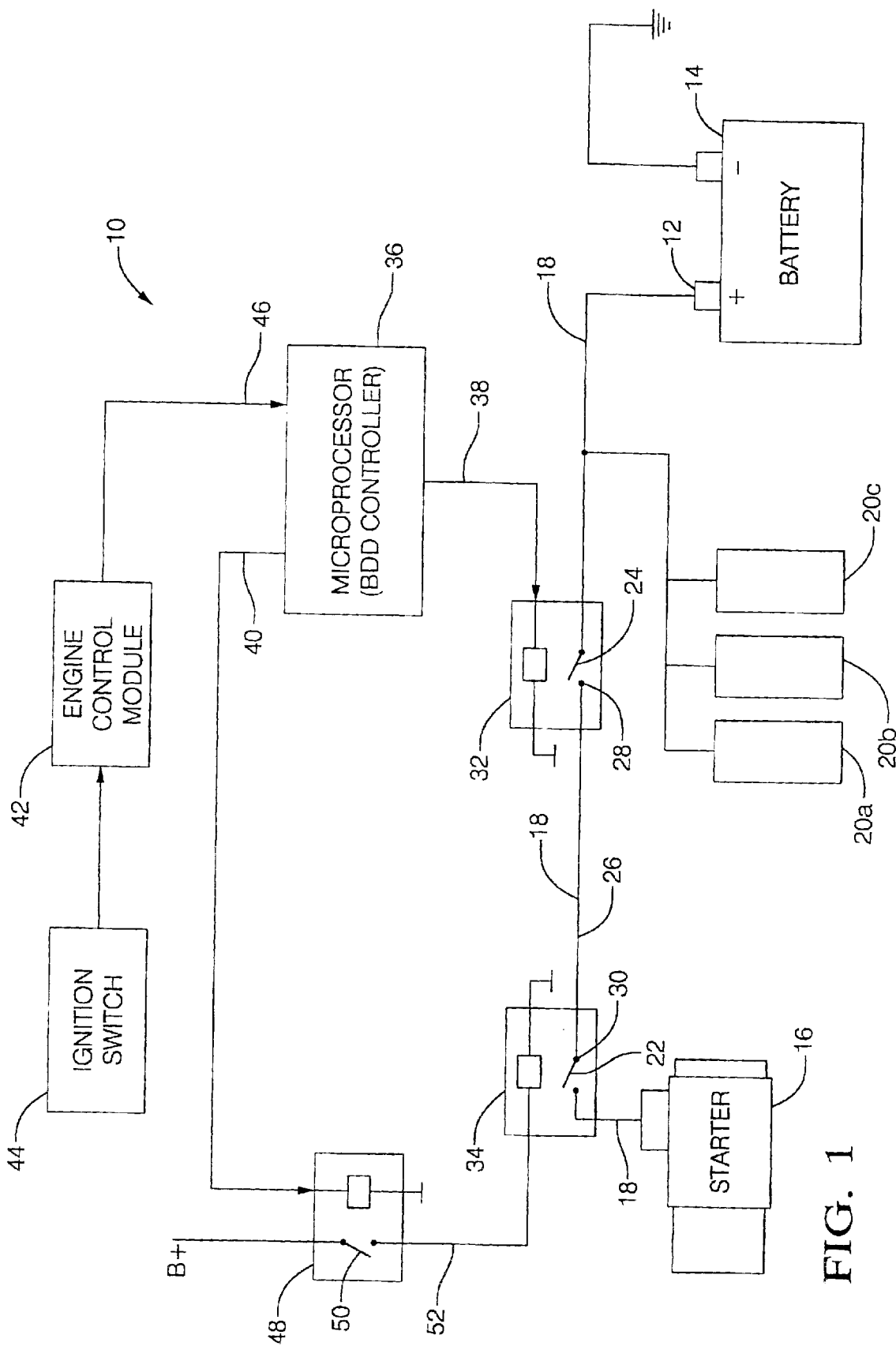
FIG. 1 is a circuit diagram illustrating the present invention.

Referring now to the drawings, FIG. 1 is a circuit diagram of a short circuit protection system 10 utilized to protect an unfused starter circuit, such as a motor vehicle starter circuit. A positive terminal 12 of a battery 14 is electrically connected to a device, in this case a starter, 16 via a conductive path that includes a starter circuit 18. The positive terminal 12 of the battery 14 is also electrically connected to other vehicle electrical loads such as lights 20a, radio 20b, and generator 20c. It will be appreciated that other vehicle loads may be added such as air conditioning, etc. A starter switch 22 is located within the starter circuit 18. The starter switch 22 is preferably an electromechanical switch actuated by a relay (starter solenoid relay) 34. Another switch, a battery disconnect device (BDD) switch 24, is located within the starter circuit 18 between the starter switch 22 and the battery 14. The BDD switch 24 is preferably an electromechanical switch actuated by a relay (BDD relay) 32. A protected conductor 26 completes the circuit 18 and runs between battery 14 and starter 16, with switches 22 and 24 there between. The protected conductor 26 represents a portion of the starter circuit 18 that is electrically protected by the present invention. The protected conductor 26 has a first end 28 that connects to the BDD switch 24 and a second end 30 that connects to the starter switch 22.

As to switches 22 and 24, it will be appreciated that other types of switches such as solid state switches may also be used. It will also be appreciated that the switches may be actuated by other mechanisms such as solid state devices.

The starter switch 22 and the BDD switch 24 are normally open and no power is supplied to the starter 16. Power is provided to starter 16 when starter switch 22 and BDD switch 24 are closed. A microprocessor (BDD controller) 36 provides the logic necessary to open BDD switch 24 via a BDD switch output 38. The BDD controller 36 also provides the logic necessary to open and close the starter switch 22 via a starter switch output 40. It will be appreciated that the logic necessary to open and close the BDD switch 24 and the starter switch 22 can be transmitted directly from another controller such as an engine control module 42.

In the preferred embodiment, the BDD controller 36 receives input of an ignition switch 44 activation from the engine control module 42 via an input 46. It will be appreciated that the ignition switch 44 activation signal can be transmitted directly from the ignition switch 44 to the BDD controller 36. It will also be appreciated that the ignition switch 44 activation signal can originate from the ignition switch within the vehicle or from another device such as a remote starter (not shown). The engine control module is also capable of providing other input signals to the BDD controller. Examples of such input signals include indications of an electrical system short circuit and vehicle theft deterrent system activation. The BDD controller 36 can also use signals of this type to command the BDD switch 24 and/or the starter switch 22 to open or close.

The BDD controller 36 controls the starter switch 22 by providing a command signal via a starter switch output 40 to an underhood bussed electrical center (UH-BEC) starter relay 48 that actuates a UH-BEC switch 50. The UH-BEC switch 50 is located in a solenoid circuit 52 intermediate to the positive terminal 12 of the battery 14 and the starter solenoid relay 34. When the UH-BEC switch 50 closes, power is supplied to enable the starter solenoid relay 34 to close the starter switch 22. When the UH-BEC switch 50 opens, power is no longer supplied to the starter solenoid relay 34. This causes the starter solenoid relay 34 to open the starter switch 22. This approach is used to actuate the starter solenoid relay 34 because the signal output provided by a typical microprocessor does not have sufficient current to directly actuate a solenoid relay such as that found in the preferred embodiment.

When the starter switch 22 and the BDD switch 24 are both closed the battery 14 supplies power to the starter 16 that then operates to start an internal combustion engine (not shown). When the starter switch 22 is open and the BDD switch 24 is closed power is not supplied to the starter 16, but voltage is still present in the protected conductor 26. When the BDD switch 24 is open, voltage is removed from the protected conductor 26 and the starter 16.

Figure 2:
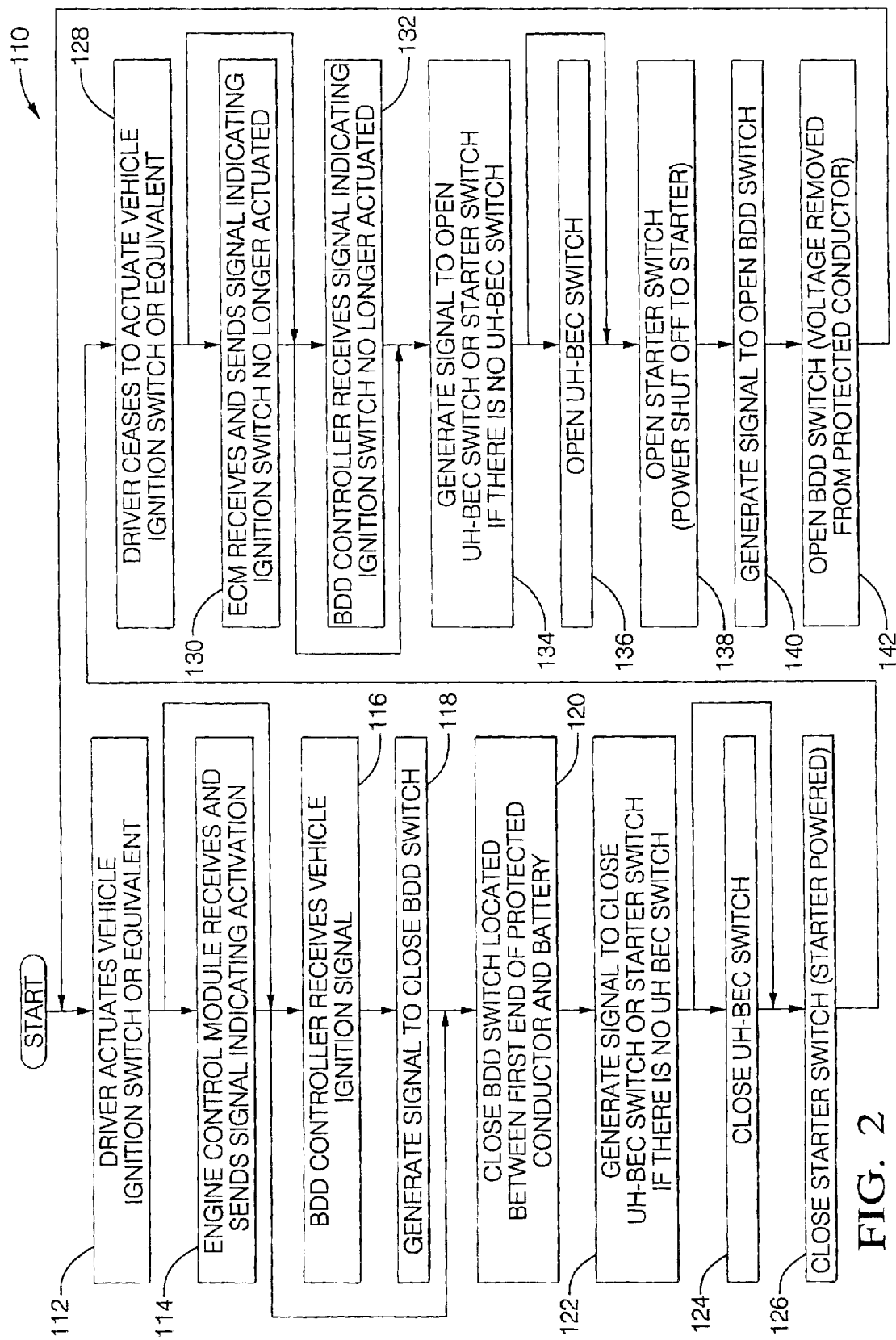
FIG. 2 is a flow diagram of the present invention.

Referring now to FIG. 2, a flowchart 110 illustrates a preferred embodiment of a method to close and open the circuit connecting the starter to a DC power source such as a battery. It will be appreciated that this method can be used to add and remove voltage from a circuit connecting a DC power supply to other types of devices.

A first step 112 depicts a vehicle driver actuating a vehicle ignition switch. A remote switch or some other mechanism may also be used to initiate vehicle start-up. A step 114 indicates that the vehicle engine control module receives a command signal indicating ignition switch activation and also further transmits a command signal indicating ignition switch activation. The command signal typically originates from the ignition switch or a remote starter. The function of retransmitting the signal may be omitted if all processing is performed in the same processor. The BDD controller then receives a signal indicating a command to start the vehicle 116. In step 118 the BDD controller generates a command signal to close the BDD switch. Alternatively the engine control module or another controller can generate the signal. It should be noted that the BDD controller could be configured so that no signal is generated when a short circuit condition or a vehicle theft is detected. Step 120 indicates that the BDD switch closes. The BDD switch is located in the starter circuit between a first end of the protected conductor and the battery. In step 122 the BDD controller generates a signal to close the UH-BEC switch or the starter switch if there is no UH-BEC switch. Alternatively the engine control module or another controller can generate the signal. Step 124 indicates to close the UH-BEC switch. This step is by-passed if there is no starter relay. Step 126 indicates to close the starter switch. The starter switch is located in the starter circuit between a second end of the protected cable and the starter. At this point the starter is powered and cranks the ignition.

Step 128 indicates the driver ceases to actuate the vehicle ignition switch or equivalent. Step 130 indicates that the vehicle engine control module receives a command signal indicating ignition switch activation has ceased and also further transmits a command signal indicating ignition switch activation has ceased. The command signal typically originates from the ignition switch or a remote starter. Another controller may also perform this step. The step is bypassed if the BDD controller performs the function. Step 132 indicates the BDD controller receives a signal indicating the ignition switch is no longer actuated. This step is by-passed if the ECM transmits the signals directly to the relays. In step 134 the BDD controller generates a signal to open the UH-BEC switch or to open the starter switch if there is no UH-BEC switch. Alternatively, the engine control module or another controller generates the signal. Step 136 indicates the UH-BEC switch opens. This step is by-passed if there is no UH-BEC switch. Step 138 indicates the starter switch opens. When this step is complete, power is no longer supplied to the starter and it ceases to operate. In step 140 the BDD controller generates a command signal to open the BDD switch. Alternatively, the engine control module or another controller may generate the signal. Step 142 indicates to open the BDD switch. After this occurs, voltage is removed from the protected conductor. The sequence begins again at step 112 the next time the vehicle driver actuates the ignition switch.

This invention has been described with reference to the preferred embodiment and modifications thereto. Further modifications and alterations may occur to others upon reading and understanding the specification. It is intended to include all such modifications and alterations insofar as they come within the scope of the invention. For example, one skilled in the art would realize that where signal generating, sending, or receiving is described herein, the intended purpose can also be accomplished by modifying or terminating an existing signal.

What is claimed is:

1. A short circuit protection system for a DC power source and a device powered by said DC power source comprising a first switch connected within a conductive path extending between said DC power source and said device, a second switch connected within said conductive path between said first switch and said DC power source, and a microprocessor for receiving at least one input signal indicating a command to operate or cease operation of said device and for generating at least one output signal to said first and second switches for opening and closing said switches, wherein said device is configured to draw a current of at least 200 amps.

2. The short circuit protection system as in claim 1, wherein said device is a motor vehicle starter.

3. The short circuit protection system as in claim 1, wherein said microprocessor is a controller.

4. The short circuit protection system as in claim 1, wherein at least one of said input signals is supplied by an engine controller.

5. The short circuit protection system as in claim 1, wherein a first input signal indicates a vehicle ignition switch or equivalent has been activated and a second input signal indicates an activation of a vehicle ignition switch or equivalent has ceased.

6. The short circuit protection system as in claim 1, wherein at least one of said output signals is supplied to a starter solenoid.

7. The short circuit protection system as in claim 1, wherein at least one of said output signals is supplied to an electrical center.

8. The short circuit protection system as in claim 1, wherein said first switch and said second switch are each an electromechanical switch actuated by a relay.

9. The short circuit protection system as in claim 1, wherein timing of a first output signal indicating a command to open said first switch occurs before a second output signal indicating a command to open said second switch.

10. The short circuit protection system as in claim 1, wherein timing of a third output signal indicating a command to close said second switch occurs before a fourth output signal indicating a command to close said first switch.

11. A method for removing voltage from a conductive path having a DC power source at a first end and a device at a second end comprising the steps of: detecting an input signal indicating a command to cease operation of said device; generating a first output signal to open a first switch that is connected within said conductive path; and generating a second output signal to open a second switch that is connected within said conductive path between said first switch and said DC power source; wherein said device is configured to draw a current of at least 200 amps.

12. The short circuit protection system as in claim 11, including providing said device as a motor vehicle starter.

13. The method as in claim 12, wherein said first signal is generated when a motor vehicle operator ceases actuation of the ignition switch or equivalent.

14. The method as in claim 12, wherein said first signal is generated when a vehicle theft deterrent system is activated.

15. The method as in claim 11, including providing said first switch as an electromechanical switch actuated by a solenoid relay.

16. The method as in claim 11, including providing said second switch as an electromechanical switch actuated by a relay.

17. The method as in claim 11, wherein said first signal is generated when a short circuit condition exists in said conductive path.

18. A method for adding and removing voltage from a conductive path having a DC power source at a first end and a device at a second end comprising the steps of: detecting a first input signal indicating a command to operate said device; generating a first output signal to close a first switch that is connected within said conductive path; generating a second output signal to close a second switch that is connected within said conductive path between said first switch and said device; detecting a second input signal indicating a command to cease operation of said device; generating a third output signal to open said second switch; and generating a fourth output signal to open said first switch, wherein said device is configured to draw a current of at least 200 amps.

19. The short circuit protection system as in claim 18, wherein said device is a motor vehicle starter.

20. The method as in claim 19, wherein said first switch is prevented from closing when a vehicle theft deterrent system is activated.

21. The method as in claim 18, wherein said second switch is an electromechanical switch actuated by a solenoid relay.

22. The method as in claim 18, wherein said first switch is an electromechanical switch actuated by a relay.

23. The method as in claim 18, wherein said first switch is prevented from closing when a short circuit condition is detected in the vehicle electrical system.

24. A system for removing voltage from a length of electrical conductor which provides a conductive path between a device and a DC power source, said system comprising:

a first switch connected at a first end of said length of electrical conductor;

a second switch connected at a second end of said length of electrical conductor between said first switch and said DC power source; and a microprocessor for receiving at least one input signal indicating a command to operate or cease operation of said device and for generating at least one output signal to said first and second switches for opening and closing said switches;

wherein said device is configured to draw a current of at least 200 amps.

25. The system as in claim 24, wherein said first switch is actuated by a solenoid.

26. A short circuit protection system for a DC power source and a device powered by said DC power source, the system comprising:

a first switch connected within a conductive path extending between said DC power source and said device, a second switch connected within said conductive path between said first switch and said DC power source, and a microprocessor for receiving at least one input signal indicating a command to operate or cease operation of said device and for generating at least one output signal to said first and second switches for opening and closing said switches, wherein said device is unfused.

27. The system as in claim 26, wherein said device comprises one or more light.

28. The system as in claim 26, wherein said device comprises a radio.

29. The system as in claim 26, wherein said device comprises a generator.

30. The system as in claim 26, wherein said device comprises an air conditioner.

31. The system as in claim 26, wherein said device is a starter.

* * * * *